UNITED STATES PATENT OFFICE.

CHARLES R. GROFF, OF ST. PAUL, MINNESOTA, ASSIGNOR, BY MESNE ASSIGNMENTS, TO THE LAUNDRY BLUE COMPANY, A CORPORATION OF ILLINOIS.

LAUNDRY BLUING.

No. 826,567.  Specification of Letters Patent.  Patented July 24, 1906.

Application filed October 20, 1903. Serial No. 177,744.

*To all whom it may concern:*

Be it known that I, CHARLES R. GROFF, a citizen of the United States, residing at St. Paul, in the county of Ramsey and State of Minnesota, have invented certain new and useful Improvements in Laundry Bluing, of which the following is a specification.

This invention relates to a laundry bluing composition; and one object is to provide a stick of bluing which will dissolve freely and completely in water, but not disintegrate or fall away in particles, and which will not harden and crack after it has been wet.

In accordance with the present invention the amorphous glassy mass which results from melting sugar is employed as a binder for the powdered blue, and most advantageously the character of this binder is modified by the incorporation therewith of a suitable material, such as granular sugar. The mixture is most conveniently used in the form of sticks, being molded while plastic. I believe, moreover, that I am the first to prepare a composition of matter for any purpose in which a coloring-matter as the principal agent, and therefore in suitably large proportion, is compounded with said amorphous glassy mass as a binder with or without a modifying material, such as granular sugar.

In what is considered the best mode of proceeding about equal parts of granulated sugar and powdered Prussian blue may be taken, and about one-third of the sugar is converted into the said amorphous glassy mass, the other two-thirds, or thereabout, remaining in a granular state and in such state being mixed with the amorphous glassy mass and with the Prussian blue. The sugar is gradually melted in a heated receptacle and stirred, so that it will liquefy evenly. I prefer to maintain as near as possible the same degree of heat around the receptacle, but not enough to burn the sugar. When the sugar has the appearance of being about one-third melted, the blue can be mixed therewith; but I prefer at that time to add first a small quantity of water and then stir in the blue, preferably by adding it in amounts from time to time until it has all been used. The mixture is then of the character of dough and can be molded into the desired form, or if permitted to dry sufficiently it can be rolled into sticks.

I do not limit the invention to the exact proportions herein specified; but I have found that these will produce a very satisfactory mixture. If more sugar is used in proportion to the blue, the solubility of the bluing will be to that extent retarded, and for some purposes this may be desirable. The sugar which has been melted solidifies when cooled to an amorphous glassy mass, which acts as a binder to hold the blue together and prevent the bluing from disintegrating when immersed in water, but permitting free and complete solubility. The binding action of said mass is modified by the unmelted sugar, which remains mixed therewith in a granular state and increases the solubility of the composition. When the composition is rolled into sticks, as above mentioned and as considered advantageous, such rolling takes place while the mixture is plastic. It subsequently hardens on further cooling. The sticks may be about half an inch in diameter or of whatever size may be preferred.

The proportion of sugar may be varied as it is desired to make a stronger or weaker binder. Without the protection afforded by the sugar the mass of blue would all dissolve at once or the undissolved portion would dry into a hard almost insoluble lump; but the sugar binder prevents this and makes the stick dissolve comparatively slowly by degrees, but fast enough to color the water, the binder serving as a protector for the blue until it is needed.

Without limiting myself to the exact proportions herein described, what I claim, and desire to secure by Letters Patent, is—

1. Laundry bluing, composed of powdered blue in suitably large proportion, and a binder for said blue of which binder the amorphous glassy mass from melted sugar is an essential constituent, substantially as described.

2. Laundry bluing composed of powdered blue, granular sugar, and the amorphous glassy mass from melted sugar, substantially as described.

CHARLES R. GROFF.

Witnesses:
F. G. BRADBERRY,
GORDON M. GROFF.